United States Patent [19]

Majola

[11] Patent Number: 5,520,805
[45] Date of Patent: May 28, 1996

[54] FILTER APPARATUS INCLUDING RING SHAPED ELEMENTS

[76] Inventor: Tauno Majola, Salpakankaantie 6A, FIN-15860 Hollola 2, Finland

[21] Appl. No.: 324,659

[22] Filed: Oct. 18, 1994

[51] Int. Cl.$^6$ .................................................. B01D 29/46
[52] U.S. Cl. .......................... 210/346; 210/409; 210/420; 210/433.1; 210/486
[58] Field of Search .................................... 210/346, 409, 210/418, 420, 433.1, 486

[56] References Cited

U.S. PATENT DOCUMENTS

| | | |
|---|---|---|
| 2,569,748 | 10/1951 | DeGrave . |
| 2,998,064 | 8/1961 | Lang ........................ 210/409 |
| 3,794,179 | 2/1974 | Doucet ...................... 210/409 |
| 4,113,626 | 9/1978 | Detcher ..................... 210/420 |
| 5,024,771 | 6/1991 | Chiarito .................... 210/409 |
| 5,332,499 | 7/1994 | Spencer ..................... 210/402 |

FOREIGN PATENT DOCUMENTS

| | | |
|---|---|---|
| 418750 | 3/1991 | European Pat. Off. . |
| 72049 | 12/1986 | Finland . |
| 87536 | 5/1989 | Finland . |
| 3429333 | 2/1986 | Germany . |
| 3603946 | 8/1987 | Germany . |
| 516331 | 1/1972 | Sweden . |
| 1564245 | 4/1980 | United Kingdom . |

Primary Examiner—Robert A. Dawson
Assistant Examiner—W. L. Walker
Attorney, Agent, or Firm—Cushman, Darby & Cushman

[57] ABSTRACT

The present invention relates to a filter apparatus for separating solids from a liquid, said apparatus comprising an outer shell (1), a pipe (2) attached thereto for liquid infeed, a filter cartridge (3) formed by ring-shaped elements placed inside said outer shell, the rings being spaced at a distance from each other so as to provide horizontally outward flaring slits (4) between the rings, through which slits the liquid is adapted to flow, a discharge pipe (5) for the removal of the liquid from the space between the outer shell and the filter cartridge, and a second discharge pipe (6) for the removal of solids from inside the filter cartridge. Conventional filter equipment have a complicated construction and require the use of separate cleaning equipment. In the filter according to the invention the leading edges (7) of the ring elements of the filter cartridge, with regard to the downward main flow direction of the liquid, extend deeper into the core of the filter cartridge than the trailing edges (8) of the ring elements.

6 Claims, 2 Drawing Sheets

FILTER APPARATUS INCLUDING RING SHAPED ELEMENTS

BACKGROUND OF THE INVENTION

1. Field of the Invention

The present invention relates to a filter apparatus for separating solids from a liquid, said apparatus comprising an outer shell, a pipe attached thereto for liquid infeed, a filter cartridge formed by ring-shaped elements placed inside said outer shell, said rings being spaced at a distance from each other so as to provide horizontally outward flaring slits between the rings, through which slits the liquid is adapted to flow, a discharge pipe for the removal of the liquid from the space between the outer shell and the filter cartridge, and a second discharge pipe for the removal of the solids from inside the filter cartridge.

2. Description of the Related Art

Solids are separated from the liquid phase by filtration in various industrial processes, water treatment plants and other applications. To this end, a plurality of different filter types are available that can be divided according to their operating principle in two categories: cartridge filters and screen/drum filters.

During the use of filter equipment, their function must be reliable, in other words, the filters may not become clogged and a facility of solids removal must be available. Cartridge filters conventionally employ various kinds of mechanical filter cartridge cleaning devices which mechanically clean the inside surface of the filter element free from adhering solids. Such filter arrangements are complicated and contain a plurality of moving elements. In screen and drum filters the filter element is moved either in a linear fashion (screen) or rotary fashion (drum). Such arrangements presuppose separate drive means resulting in a complex construction. Screen and drum filters are further characterized by their relatively large size. Conventional equipment is complicated, expensive to manufacture and generally requires separate drive means for continuous function. A further disadvantage is therein that such equipment cannot always be connected to an industrial process as a permanent element of the piping.

SUMMARY OF THE INVENTION

It is an object of the present invention to provide a filter apparatus capable of overcoming the drawbacks of conventional equipment. It is a particular object of the invention to provide a filter apparatus having a construction which is simple, reliable in its function, cost-efficient to manufacture and use, and which disposes of the need for moving parts and a separate drive means. It is a further particular object of the invention to provide a filter apparatus suited for connection as a permanent element of process piping.

The goal of the invention is achieved by a filter apparatus characterised by what is stated in the appended claims.

In the filter apparatus according to the invention, the leading edges of the ring elements of the filter cartridge, with regard to the downward main flow direction of the liquid, extend deeper into the core of the filter cartridge than the trailing edges of the ring elements. Then, the downward flow of the liquid along the vertical core channel of the filter prevents adherence of solids particles onto the inner surface of the filter. The solids are conveyed to a discharge pipe adapted directly to the lower part of the filter apparatus, whereby their adherence to the inner surface of the filter is avoided. The filter portion itself requires no mechanical means for keeping the filter unclogged and assuring continuous operation of the filter. In other words, the filter is self-cleaning as the liquid flow continuously cleans the filter without the need for any external cleaning means.

BRIEF DESCRIPTION OF THE DRAWINGS

In the following the invention is examined in greater detail with reference to the annexed drawings, in which.

DETAILED DESCRIPTION OF THE PRESENTLY PREFERRED EXEMPLARY EMBODIMENT

Figure 2:
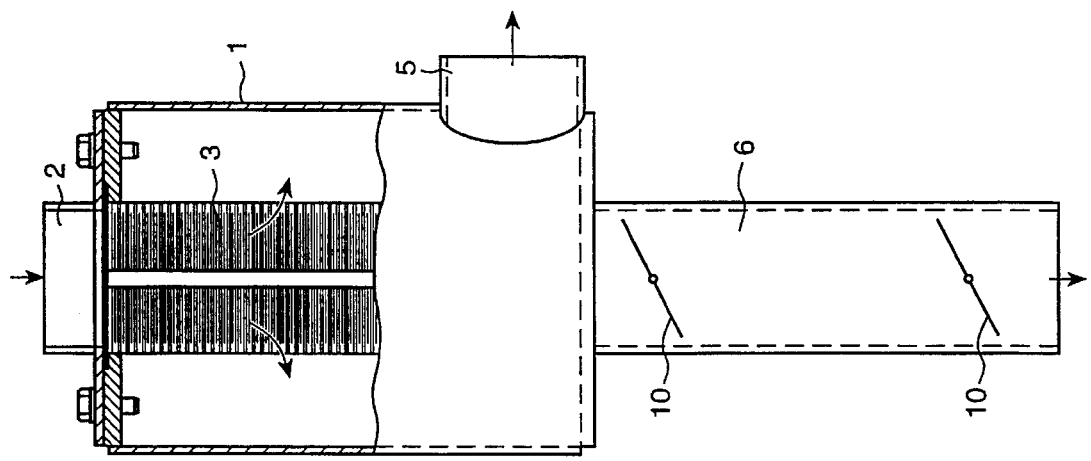
FIG. 2 is a partially sectional side view of another embodiment of the filter apparatus according to the invention.

In the embodiments illustrated in the drawings, the filter apparatus comprises an outer shell 1, an infeed pipe 2, a filter cartridge 3, discharge pipes 5 and 6, and a solids collector device 10. Via the infeed pipe 2 into the apparatus is passed liquid from which the solids are to be separated. The filter cartridge 3 is located within the interior of the outer shell as an extension of the infeed pipe 2. The filter cartridge is formed from substantially equal-size rings so vertically spaced at a distance from each other as to form narrow slits 4 between the rings. The outer shell and the filter cartridge are outdistanced from each other by a space 11 to which a discharge pipe 5 is connected for removal and discharge of liquid passing into the space through the filter cartridge. Also the outlet end of the filter cartridge core is open and has a solids discharge pipe 6 connected thereto for the removal of solids from the filter apparatus. The core of the filter cartridge is provided with an auger-shaped element 9 suited for effectively directing the liquid close to the filter ring elements and thus passing the filter slits.

Figure 1:
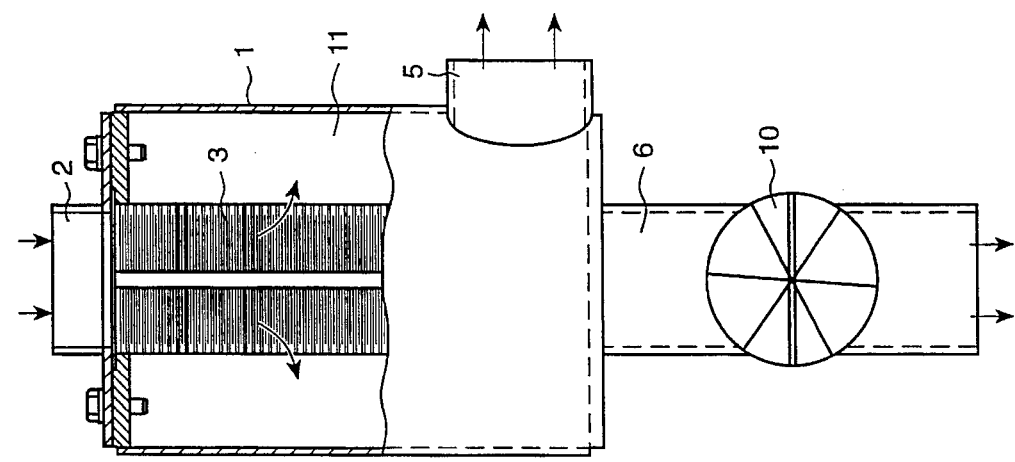
FIG. 1 is a partially sectional side view of an embodiment of the filter apparatus according to the invention.

In the embodiment illustrated in FIG. 1, the second discharge pipe 6 is provided with a solids collector device 10 which in this construction is a continuously functioning metering device. In the embodiment illustrated in FIG. 2, the collector device 10 is formed by two gate valves adapted in series in the discharge pipe.

Figure 3:
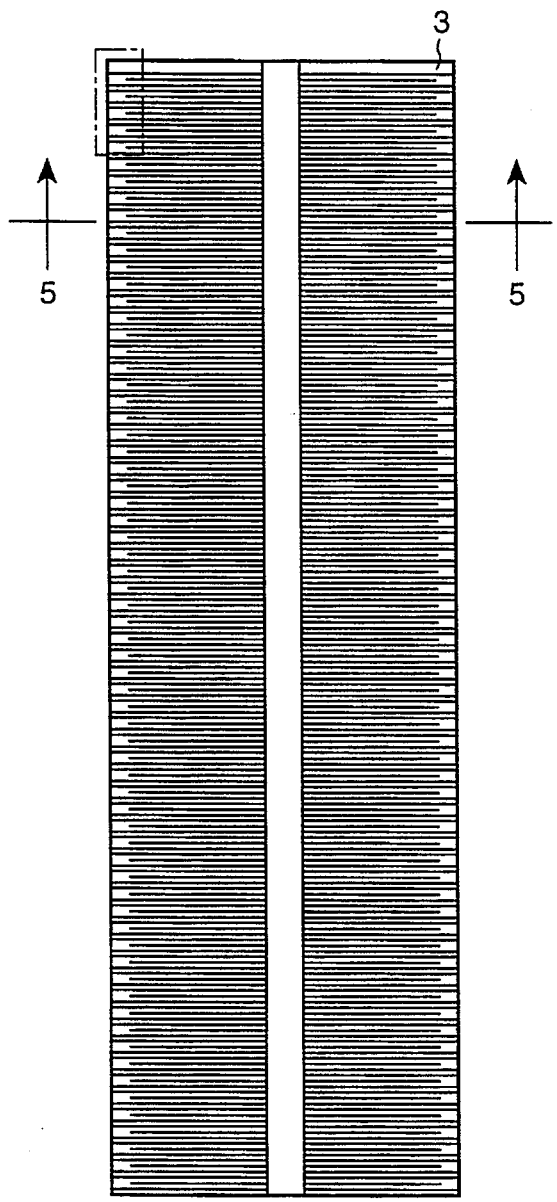
FIG. 3 is a side view of the filter apparatus according to the invention.
Figure 4:
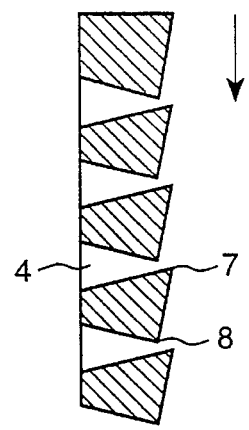
FIG. 4 is an enlarged cross-sectional detail view of the filter apparatus illustrated in FIG. 3.
Figure 5:
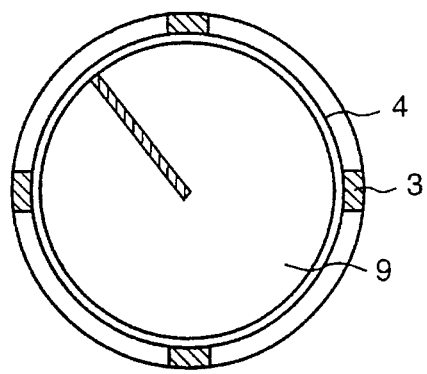
FIG. 5 is cross-sectional view along the plane 5—5 of the filter apparatus illustrated in FIG. 3.

As is evident from FIGS. 3 and 4, the ring elements of the filter cartridge are vertically spaced at a distance from each other so as to form slits 4 between the rings horizontally to the filter core, that is, perpendicular to main flow direction of the liquid (denoted by an arrow in FIG. 4) from the infeed pipe toward the core of the cartridge filter. The slits are designed radially outward flaring and the flaring angle of the slits may vary widely in the various applications of the invention depending on the filter material selection and other design parameters. The flaring angle may advantageously be varied in the range of approx. 25°–90°, while in the embodiment described above it is approx. 25°–35°. In the main downward flow direction of the liquid, the leading edge 7 of the ring element extends deeper into the core of the filter cartridge than the trailing edge 8 of the ring, and toward the filter center axis the ring element has an angled inside face. The slits between the rings have toward the filter center axis an entrance width of less than 5 mm in this embodiment, whilst in most filter applications the slit entrance width may be appreciably less than 5 mm.

During the use of the filter apparatus, the liquid is passed into the apparatus via the infeed pipe. The liquid flows along the auger-shaped core element, whereby the auger directs the liquid against the inside surface of the filter cartridge. However, the solids particles cannot adhere to the inside surface of the filter as the main flow of the liquid is directed downward tangentially to the filter inside surface. Obviously, the clear liquid can pass through the slits between the rings of the filter cartridge and the filtered liquid is taken via the liquid discharge pipe out from the filter apparatus. A minor portion of the liquid flow and the separated solids are collected by gravity into the second discharge pipe of the filter apparatus, wherefrom they are removed to subsequent process steps.

The invention is not, however, limited by the advantageous embodiment described above, but rather, can be varied within the scope of the inventive spirit disclosed in the appended claims.

I claim:

1. A filter apparatus for separating solids from a liquid, said apparatus comprising an outer shell, a pipe attached to said outer shell for liquid infeed, a filter cartridge formed by ring-shaped elements placed inside said outer shell and spaced therefrom to define a space between said outer shell and said filter cartridge, said ring-shaped elements being spaced at a distance from each other so as to provide horizontally outward flaring slits between the ring shaped elements, through which slits the liquid is adapted to flow, a discharge pipe for removal of liquid from the space between the outer shell and the filter cartridge and a second discharge pipe for removal of solids from inside the filter cartridge, wherein each said ring-shaped element has a radially inner leading edge and a radially inner trailing edge with respect to a downward main flow direction of the liquid, each said radially inner leading edge being radially spaced from a central axis of said filter cartridge by an amount less than said respective radially inner trailing edge.

2. A filter apparatus as defined in claim 1, wherein the ring-shaped elements forming the filter cartridge are essentially equal in size.

3. A filter apparatus as defined in claim 1 or claim 2, wherein an auger-shaped element extends along the central axis of the filter cartridge for directing the liquid being filtered against an inside surface of the filter cartridge.

4. A filter apparatus as defined in any of foregoing claim 1, wherein the flaring angle of the slits is 25°–90°.

5. A filter apparatus as defined in any of foregoing claim 4, wherein the entrance width of the slits at the inside surface of the filter cartridge is smaller than 5 mm.

6. A filter apparatus as defined in claim 1, wherein the second discharge pipe is connected to a solids collector device for collecting the separated solids.

\* \* \* \* \*